United States Patent [19]

Jaggard et al.

[11] Patent Number: 4,761,461

[45] Date of Patent: Aug. 2, 1988

[54] PREPARATION OF HOMOPOLYMERS AND COPOLYMERS OF PROPYLENE BY MEANS OF A ZIEGLER-NATTA CATALYST SYSTEM

[75] Inventors: James F. R. Jaggard, Gruenstadt; Rainer A. Werner, Bad Durkheim; Wolfgang Gruber, Frankenthal, all of Fed. Rep. of Germany

[73] Assignee: BASF Aktiengesellschaft, Ludwigshafen, Fed. Rep. of Germany

[21] Appl. No.: 930,529

[22] Filed: Nov. 14, 1986

[30] Foreign Application Priority Data

Nov. 16, 1985 [DE] Fed. Rep. of Germany ....... 3540699

[51] Int. Cl.$^4$ .......................... C08F 4/02; C08F 10/06
[52] U.S. Cl. ..................... 526/125; 502/127; 526/351; 526/901
[58] Field of Search .......................................... 526/125
[56] References Cited

U.S. PATENT DOCUMENTS 4,330,649 5/1982 Kioka et al. ........................ 526/125
4,579,919 4/1986 Staiger et al. ...................... 526/119

FOREIGN PATENT DOCUMENTS 45977 2/1982 European Pat. Off. .
2111066 6/1983 United Kingdom .
2143834A 2/1985 United Kingdom .

*Primary Examiner*—Edward J. Smith
*Attorney, Agent, or Firm*—Keil & Weinkauf

[57] ABSTRACT

Polymers of polypropylene are prepared by means of a Ziegler-Natta catalyst system comprising (1) a titanium component which contains titanium, magnesium, chlorine and a benzenecarboxylic acid derivative, (2) an aluminum component and (3) a silane component, wherein the (1) used is obtained by (1.1) first reacting with one another (1.1.1) in a liquid hydrocarbon, (1.1.2) a finely divided magnesium halide, (1.1.3) an alkanol, (1.1.4) a phthalic acid ester and (1.1.5) titanium tetrachloride under certain conditions, (1.2) then extracting the solid intermediate obtained from (1.1) with titanium tetrachloride until the remaining solid substance has become significantly richer in magnesium, and (1.3) finally washing the solid substance remaining in (1.2) with an alkane in a certain manner.

1 Claim, No Drawings

PREPARATION OF HOMOPOLYMERS AND COPOLYMERS OF PROPYLENE BY MEANS OF A ZIEGLER-NATTA CATALYST SYSTEM

The present invention relates to a process for preparing homopolymers of propylene and copolymers of propylene with minor amounts of other $C_2$-$C_6$-alpha-monoolefins by polymerization, in particular by dry phase polymerization, of the monomer or monomers at 20°–160° C., preferably 50°–120° C., in particular 50°–90° C., and 1–100, preferably 8–70, in particular 10–50, bar, by means of a Ziegler-Natta catalyst system comprising (1) a titanium component which contains titanium, magnesium, chlorine and a benzenecarboxylic acid derivative, (2) an aluminum component of the formula $$X \, Al \, R_2^1$$

where
X is $R^1$ or chlorine and
$R^1$ is alkyl of not more than 8, in particular not more than 4, carbon atoms, (3) a silane component of the formula $$R_n^2 \, Si(OR^3)_{4-n}$$

where
$R^2$ is aryl or alkyl of not more than 16, preferably not more than 10, carbon atoms, in particular phenyl,
$R^3$ is alkyl of not more than 15, in particular not more than 7, carbon atoms and
n is 0, 1, 2 or 3, in particular 0, 1 or 2,
with the proviso that the atomic ratio of titanium in titanium component (1):aluminum in aluminum component (2) is from 1:10 to 1:500, in particular from 1:20 to 1:200, and of aluminum in aluminum component (2):silicon in silane component (3) is 1:0.01 from 0.5, in particular 1:0.03 to 1:0.3.

Polymerization processes of this type are known; they differ from other comparable processes in the specific embodiment of the catalyst system. Prototypes for the present case are the processes known from European Patent No. 45,977, European Laid-Open Application No. 144,021 and British Patent No. 2,143,834.

The specific embodiments of the catalyst system are intended to achieve certain objectives, for example the following:

(A) Catalyst systems which lead to polymers having a high proportion of stereoregular (=isostatic) polymer.

(B) Catalyst systems which are capable of providing an increased yield of polymer, namely systems of increased productivity, ie. systems where the amount of polymer formed per unit weight of catalyst system is increased.

(C) Catalyst systems whereby less halogen is introduced into the polymer; which can be achieved by increasing the yield as per (B).

(D) Catalyst systems whose peak activity remains constant, or relatively constant, over a very long time; which is of great importance not only as regards catalyst yields but also in the preparation of homopolymers and copolymers, in particular block copolymers, by the cascade process.

(E) Catalyst systems which affect the morphological properties of the polymers in a certain way, say in the direction of a uniform particle size and/or a reduced fines content and/or a high bulk density; which can be of importance for example for the technical control of the polymerization systems, the workup of the polymers and/or the processibility of the polymers.

(F) Catalyst systems which make it possible, in the case of polymerizations in the presence of a molecular weight regulator, such as, in particular, hydrogen, to make do with relatively small amounts of regulator; which can be of importance for example for the thermodynamics of process control.

(G) Catalyst systems which are tailor-made for specific polymerization processes, for example those which are adapted either to the specific characteristics of suspension polymerization or to those of dry phase polymerization.

(H) Catalyst systems which lead to polymers whose range of properties makes them particularly suitable for one or other application area.

(I) Catalyst systems whose titanium component (1) is particularly easy to prepare.

(K) Catalyst systems which make it possible to prepare polymers of particularly low odor.

It is known from experience that several of the above-mentioned objectives can only be achieved with specific embodiments of the catalyst system by compromising on other objectives.

In these circumstances, it is generally desirable to find those embodiments which achieve the stated objectives with a minimum of compromise on the other desirable objectives.

It is an object of the present invention to provide a new embodiment of a catalyst system with which, compared with known embodiments, it is possible to obtain better results, given comparable objectives, namely better results with respect to the objectives listed above under (A), (C), (G) and (I) with a minimum of compromise on the objectives mentioned under (D), (E) and (H).

We have found that this object can be achieved with a catalyst system of the type mentioned at the beginning with a titanium component (1) prepared in three stages in a particular way from specific starting materials.

The present invention accordingly provides a process for preparing homopolymers of propylene and copolymers of propylene with minor amounts of other $C_2$–$C_6$ alpha-monoolefins by polymerization, in particular by dry phase polymerization, of the monomer of monomers at 20°–160° C., preferably 50°–120° C., in particular 50°–90° C., and 1–100, preferably 8–70, in particular 10–50, bar, by means of a Ziegler-Natta catalyst system comprising (1) a titanium component which contains titanium, magnesium, chlorine and a benzenecarboxylic acid derivative, (2) an aluminum component of the formula $$X \, Al \, R_2^1$$

where
X is $R^1$ or chlorine and
$R^1$ is alkyl of not more than 8, in particular not more than 4, carbon atoms, (3) a silane component of the formula $$R_n^2 \, Si(OR^3)_{4-n}$$

where $R^2$ is aryl or alkyl of not more than 16, preferably not more than 10, carbon atoms, in particular phenyl, $R^3$ is alkyl of not more than 15, in particular not more than 7, carbon atoms and n is 0, 1, 2 or 3, in particular 0, 1 or 2, with the proviso that the atomic ratio of titanium in titanium component (1):aluminum in aluminum component (2) is from 1:10 to 1:500, in particular from 1:20 to 1:200, and of aluminum in aluminum component (2):silicon in silane component (3) is from 1:0.01 to 0.5, in particular from 1:0.03 to 1:0.3.

The process according to the invention comprises using a titanium component (1) obtained by first of all reacting (1.1) in a first stage (1.1.1) in a liquid alkane or aromatic hydrocarbon, in particular in a liquid alkane hydrocarbon, (1.1.2) a finely divided magnesium compound having a particle diameter within the range from 0.01 to 5, preferably from 0.01 to 2, in particular from 0.05 to 0.3, mm and the formula $$MgX_2$$

where X is halogen, in particular chlorine, (1.1.3) an alcohol of the formula $$R^4OH$$

where $R^4$ is $C_1$–$C_8$-alkyl, preferably $C_2$–$C_6$-alkyl, in particular $C_2$-alkyl, (1.1.4) a phthalic acid derivative of the formula

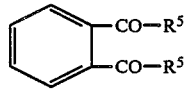

where $R^5$ is $C_1$–$C_{18}$-alkoxy, preferably $C_2$–$C_{12}$-alkoxy, in particular $C_2$–$C_8$-alkoxy and (1.1.5) titanium tetrachloride with one another by (1.1.A) first bringing together the magnesium compound and the alcohol with constant mixing at from $-20°$ to $+40°$ C., in particular from $+10°$ to $+30°$ C., using per 100 mole parts of the hydrocarbon from 5 to 30, preferably from 10 to 20 and in particular from 13 to 18, mole parts of magnesium compound and per 100 mole parts of magnesium compound from 100 to 600, in particular from 200 to 400 and very particularly from 200 to 350 mole parts of the alcohol, the mixing being continued for from 0.2 to 12, in particular from 0.5 to 4, hours and the temperature being maintained at from $-20°$ to $+150°$, in particular from $+50°$ to $+130°$ C., (1.1.B) subsequently adding the titanium tetrachloride with constant mixing from $-20°$ to $+40°$ C., in particular from $+10°$ to $+30°$ C., using per 100 mole parts of alcohol from 50 to 500, preferably from 80 to 300, in particular from 90 to 250, mole parts of titanium tetrachloride, and with constant mixing, maintaining the resulting mixture at $10°$–$150°$ C., in particular $60°$–$120°$ C., for from 0.1 to 4, in particular from 0.2 to 2.5, hours (a shorter time requiring a higher temperature, and vice versa), with the proviso that the phthalic acid derivative is added during process steps (1.1.A) and/or (1.1.B), in an amount, per 100 mole parts of magnesium compound, of from 1 to 50, preferably from 5 to 30, and in particular from 10 to 25 mole parts, and isolating the resulting solid intermediate by separating off the remaining liquid phase, then (1.2) in a second stage extracting the solid intermediate obtained from stage (1.1), which is A weight percent magnesium, at $100°$–$150°$ C., in particular $115°$–$135°$ C., semicontinuously or continuously, in particular continuously, with titanim tetrachloride until the remaining solid substance has become richer in magnesium by a factor of from 1.1 to 2.4, in particular from 1.4 to 2.0, ie. comprises from $1.1 \times A$ to $2.4 \times A$, in particular from $1.4 \times A$ to $2.0 \times A$, weight percent magnesium, and finally (1.3) washing in a third stage the extraction-moist solid substance remaining in stage (1.2) with a liquid $C_5$-$C_8$-alkane 1, 2, 3, 4, 5, 6, 7, 8, 9 or 10, in particular 3, 4 or 5, times, using per 100 parts by weight of solid substance from 300 to 400 parts by volume of alkane per wash step, and in this way recovering with the solid substance produced in stage (1.3) said titanium component (1).

There now follow notes on detailed aspects of the process according to the invention:

Provided the features essential to the invention are complied with, the polymerization process per se can be carried out in virtually any technological embodiment customary in the art, for example as a batchwise, semicontinuous or continuous process, as, for example, a suspension polymerization process or in particular dry phase polymerization process. The technological embodiments mentioned, in other words the technological variants of the Ziegler-Natta polymerization of alphamonoolefins, are well known from the literature and practical experience, so that any further comment is superfluous.

For completeness, it should be mentioned that, in the process according to the invention, even the molecular weights of the polymers can be regulated by the measures customary in the field, for example by means of regulators, such as, in particular, hydrogen.

It is to be additionally noted, furthermore, that in the process according to the invention the components of the catalyst system can be introduced into the polymerization space in various ways, for example (i) titanium component (1) as one component, aluminum component (2) and silane component (3) as two further components all spatially together, (ii) the same three components all spatially separated from one another, (iii) titanium component (1) on the one hand and a mixture of (2) and (3) on the other spatially separated from one another, which can be of advantage in particular in the dry phase polymerization process, or (iiii) a mixture of titanium component (1) and silane component (3) on the one hand and aluminum component (2) on the other spatially separated from each other.

There now follow notes concerning detailed aspects of the material side of the novel catalyst system:

(1) The liquid hydrocarbon (1.1.1) used to prepare the titanium component can be any hydrocarbon of the type which is customarily brought together with titanium components for catalyst systems of the Ziegler-Natta type without damage to the catalyst system or the titanium component thereof. Examples of suitable hydrocarbons are: pentanes, hexanes, heptanes, gasolines and cyclohexane.

The magnesium compound (1.1.2) can be a customary compound of the indicated formula. It should be substantially anhydrous, ie. its water content should not exceed 1 percent by weight of the total amount of magnesium chloride.

Alcohol (1.1.3) used for preparing titanium component (1), a suitable alcohol being in particular ethanol, and also the phthalic acid derivative (1.1.4) likewise to be used can be of the commercially available type; they should advantageously have relatively high degrees of purity.

The titanium tetrachloride used for preparing titanium component (1) should be of the type customary with Ziegler-Natta catalyst systems.

The alkane to be used in stage (1.3) for preparing titanium component (1) can likewise be of the customary type; it should advantageously have a relatively high degree of purity.

The preparation of titanium component (1) is simple and requires no detailed explanation. It merely has to be mentioned in connection with stages (1.1), (1.2) and (1.3) that the solid which results in each case is expediently isolated by filtration.

(2) A suitable aluminum component (2) can be any customary aluminum compound in the field having the indicated formula; such compounds are so well known from the literature and practical experience that they need not be discussed in any more detail. An outstanding representative is for example triethylaluminum.

(3) The catalyst system is completed by silane component (3) which is in particular a tetra-, tri- or dialkoxy silane of the indicated formula. Outstanding representatives are for example triethoxyphenylsilane and dimethoxydiphenylsilane.

The process according to the invention makes it possible to prepare homopolymers and copolymers, for example of the binary or ternary type, including block copolymers, of propene with minor amounts of other $C_2$-$C_6$-alphamonoolefins in an advantageous manner, particularly suitable alpha-monoolefins being ethene, but-1-ene and hex-1ene.

EXAMPLE

Preparation of titanium component (1)

First
(1.1) in a first stage
(1.1.1) in heptane
(1.1.2) a magnesium chloride having a particle diameter of from 0.08 to 0.2 mm,
(1.1.3) ethanol,
(1.1.4) di-n-butyl phthalate and
(1.1.5) titanium tetrachloride are reacted with one another in amounts of 15 mole parts of magnesium chloride per 100 mole parts of heptane, 250 mole parts of ethanol and 20 mole parts of di-n-butyl phthalate per 100 mole parts of magnesium chloride, and 200 mole parts of titanium tetrachloride per 100 mole parts of ethanol by first of all
(1.1.A) bringing together, with constant mixing by vigorous stirring, the magnesium compound, the alcohol and the phthalic acid derivative initially at 20° C., continuing the mixing process for 2 hours and maintaining the temperature at 95° C., then
(1.1.B) with constant mixing by vigorous stirring adding the titanium tetrachloride at 20° C., heating the mixture to 95° C. and maintaining it at that temperature for 1 hour and isolating the resulting solid intermediate from the remaining liquid phase by filtering off with suction on a glass frit (a small portion of the solid intermediate was washed with heptane and dried and was found to have a magnesium content of 11.4% by weight) then
(1.2) in a second stage distilling titanium tetrachloride out of a stock reservoir vessel onto the intermediate from (1.1) in the glass frit, so that with stirring a suspension forms from extractant and solid intermediate, the temperature of which is maintained at 125° C., the amount of extractant which is being continuously distilled onto the intermediate running off through the glass frit into the stock reservoir vessel, continuing this process until the magnesium content of the solid substance is 19.8% by weight, then, by filtration, separating off the liquid phase from the solid and finally
(1.3) in a third stage removing the liquid phase remaining in the solid by washing 4 times with n-heptane, 350 parts by volume of n-heptane being used each time per 100 parts of weight of solid, and after drying isolating said titanium component (1).

POLYMERIZATION

A 10 L capacity steel autoclave equipped with a stirrer is charged with 50 g of polypropylene powder, 10 mmol of triethylaluminum as aluminum component (2), 1 mmol of triethoxyphenylsilane as silane component (3), 5 liters (S.T.P.) of hydrogen and 0.05 mmol, calculated as titanium, of above titanium component (1) at 30° C. The reactor temperature is raised to 70° C. in the course of 10 minutes, while the reactor pressure is raised to 27 bar in this time by injecting gaseous propylene.

The actual polymerization is carried out at 70° C. and 27 bar for 2 hours with constant stirring, consumed monomer being continuously replenished. This gives 2,100 g of polymer, corresponding to a yield of 22,300 g of polypropylene per g of titanium component (1), the polymer containing 2.4% of solubles in boiling heptane (as a measure of stereoregularity) and having a very high bulk density.

We claim:
1. A process for preparing homopolymers of propylene and copolymers of propylene with minor amounts of other $C_2$–$C_6$-alpha-monoolefins by polymerizing the monomer or monomers at 20°-160° C. and 1-100 bar by means of a Ziegler-Natta catalyst system comprising
(1) a titanium component which contains titanium, magnesium, chlorine and a benzenecarboxylic acid derivative,
(2) an aluminum component of the formula

$$X\ Al\ R_2^1$$

where
X is $R^1$ or chlorine and
$R^1$ is alkyl of not more than 8 carbon atoms,
(3) a silane component of the formula $$R_n^2\ Si(OR^3)_{4-n}$$

where
$R^2$ is aryl or alkyl of not more than 16 carbon atoms,
$R^3$ is alkyl of not more than 15 carbon atoms and
n is 0, 1, 2 or 3, with the proviso that the atomic ratio of titanium in titanium component (1):aluminum in aluminum component (2) is from 1:10 to 1:500 and of aluminum in aluminum component (2):silicon in silane component (3) is from 1:0.01 to 1:0.5,
which comprises using a titanium component (1) obtained by first of all reacting
(1.1) in a first stage
(1.1.1) in a liquid alkane,
(1.1.2) a finely divided magnesium compound having a particle diameter within the range from 0.01 to 5 mm and the formula $MgX_2$ where X is halogen,
(1.1.3) an alcohol of the formula $R^4OH$ where $R^4$ is $-C_2$-alkyl,
(1.1.4) a phthalic acid derivative of the formula

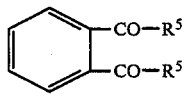

where $R^5$ is $C_1-C_8$-alkoxy and
(1.1.5) titanium tetrachloride with one another by
(1.1.A) first bringing together the magnesium compound and the alcohol with constant mixing at from $-20°$ to $+40°$ C. using per 100 mole parts of the hydrocarbon from 5 to 30 mole parts of magnesium compound and per 100 mole parts of magnesium compound from 200 to 350 mole parts, of the alcohol, the mixing being continued for from 0.2 to 12 hours and the temperature being maintained at from $+50°$ to $+130°$ C.,
(1.1.B) subsequently adding the titanium tetrachloride with constant mixing at from $-20°$ to $+40°$ C. using per 100 mole parts of alcohol from 50 to 500 mole parts of titanium tetrachloride, and with constant mixing maintaining the resulting mixture at $10°-150°$ C. for from 0.1 to 4 hours with the proviso that the phthalic acid derivative is added during process steps (1.1.A) and/or (1.1.B), in an amount, per 100 mole parts of magnesium compound, of from 10 to 25 mole parts, and isolating the resulting solid intermediate by separating off the remaining liquid phase, then
(1.2) in a second stage extracting the solid intermediate obtained from stage (1.1), which is A weight percent magnesium, at $100°-150°$ C., continuously, with titanium tetrachloride until the remaining solid substance has become richer in magnesium by a factor of from 1.1 to 2.4, i.e. comprises from $1.1 \times A$ to $2.4 \times A$ weight percent magnesium, and finally
(1.3) washing in a third stage the extractant-moist solid substance remaining in stage (1.2) with a liquid $C_5-C_8$-alkane 1, 2, 3, 4, 5, 6, 7, 8, 9 or 10 times, using per 100 parts by weight of solid substance from 300 to 400 parts by volume of alkane per wash step, and in this way recovering with the solid substance produced in stage (1.3) said titanium component (1).

* * * * *